United States Patent
Frascaroli et al.

(10) Patent No.: US 6,364,408 B1
(45) Date of Patent: Apr. 2, 2002

(54) AIR DEFLECTING APPARATUS FOR A MOTOR VEHICLE

(75) Inventors: Stefano Frascaroli, Waterford; Partha Datta, Novi; Steve Klotz, Commerce Township; Eugenia Popescu, Farmington Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/748,031

(22) Filed: Dec. 22, 2000

(51) Int. Cl.⁷ .................................................. B60J 7/22
(52) U.S. Cl. .......................................... 296/217; 296/91
(58) Field of Search ....................... 296/217, 91, 180.1, 296/180.2, 180.4

(56) References Cited

U.S. PATENT DOCUMENTS

| | | | |
|---|---|---|---|
| 4,052,099 A | * 10/1977 | Lowery et al. .............. 296/91 |
| 4,781,140 A | 11/1988 | Gantner et al. ............. 296/217 |
| 4,934,754 A | 6/1990 | Cioffi .......................... 296/217 |
| 5,018,782 A | 5/1991 | Fiegel et al. ................. 296/217 |
| 5,052,745 A | 10/1991 | Preiss .......................... 296/217 |
| 5,253,829 A | * 10/1993 | Willey ......................... 296/217 |
| 5,292,166 A | * 3/1994 | Emery .......................... 296/91 |
| 5,924,756 A | * 7/1999 | Homa ....................... 296/91 X |
| 5,971,472 A | 10/1999 | Schreiter et al. ............ 296/217 |
| 6,135,544 A | 10/2000 | Kohlpainter et al. ........ 296/217 |
| 6,174,025 B1 | * 1/2001 | Henderson, III et al. ... 296/217 |

FOREIGN PATENT DOCUMENTS

DE    2154707    * 5/1973 ................. 296/217

* cited by examiner

Primary Examiner—Joseph D. Pape
(74) Attorney, Agent, or Firm—Ralph E. Smith

(57) ABSTRACT

An apparatus for reducing buffeting in a vehicle caused by airflow over a removable or retractable roof-opening includes a rail that is mounted adjacently to the leading edge of the roof-opening. Attached to the rail is an angled deflector that diverts the airflow away from the roof-opening. Extending from the top edge of the deflector is a trip segment that causes the airflow to stabilize and reattach at a point beyond the roof-opening of the vehicle.

14 Claims, 3 Drawing Sheets

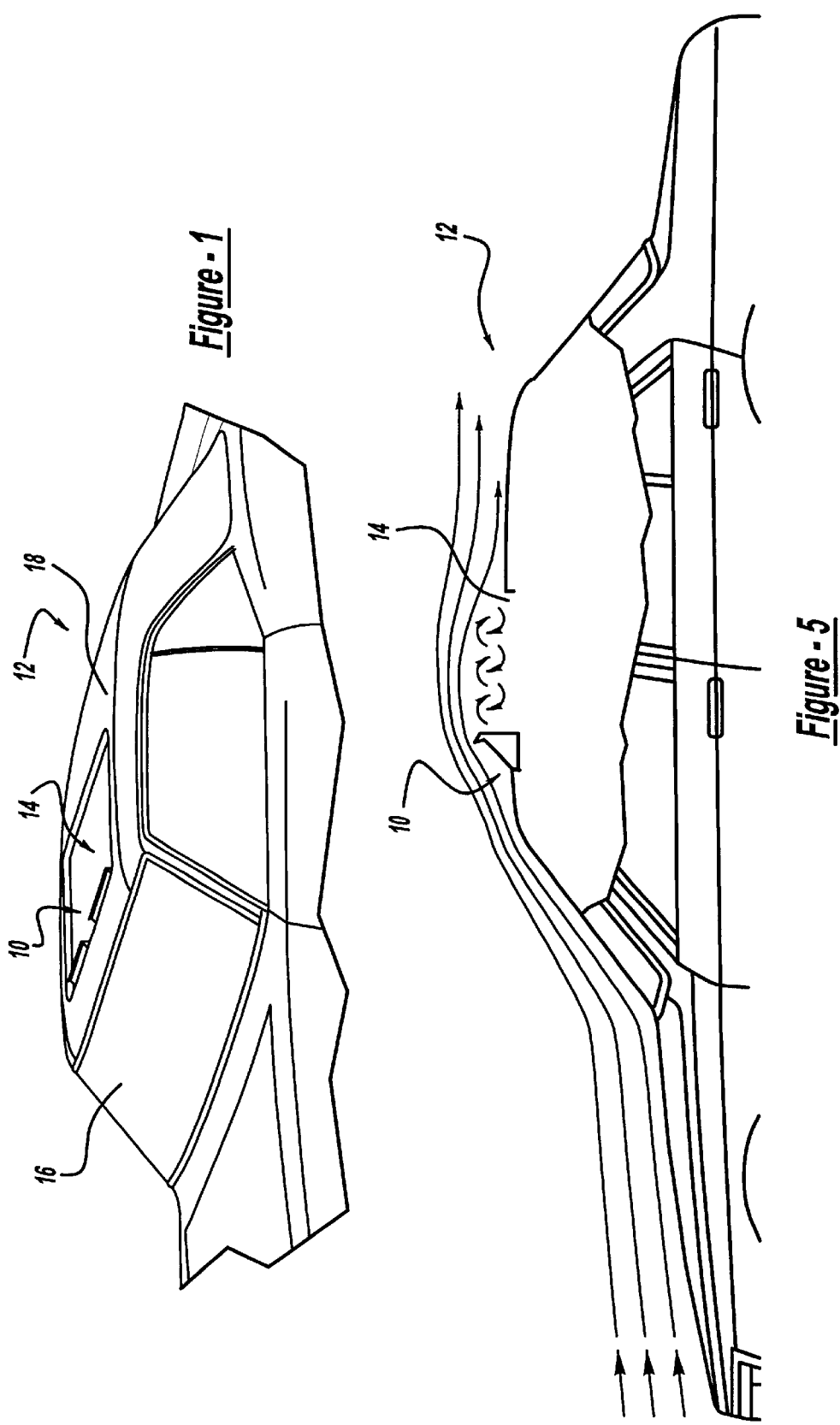

AIR DEFLECTING APPARATUS FOR A MOTOR VEHICLE

BACKGROUND OF THE INVENTION

1. Technical Field

The present invention generally pertains to motor vehicles. More particularly, the present invention pertains to an air deflecting apparatus for sliding roof segments, detachable roof segments and the like. More specifically, but without restriction to the particular embodiment and/or use which is shown and described for purposes of illustration, the present invention relates to a trip feature attached to a sunroof deflector on a vehicle.

2. Discussion

Increasingly, sunroofs and removable/retractable roofs have become popular in vehicles as factory options as well as after market accessories. Sunroofs and removable/retractable roofs allow the driver to obtain additional light as well as a feeling of openness while in the vehicle. However, the addition of an opening in the roof of a vehicle causes air to be ingested into the passenger compartment. In recognition of this effect, it is known in the pertinent art to add air deflectors to the front edge of the roof-opening to divert airflow up and away from the roof-opening.

Many different styles of air deflectors are utilized to divert airflow over a roof-opening. Some deflectors are a simple ramp feature that extends the length of the front edge of the roof-opening. The ramp feature diverts airflow up and away from the roof-opening. Other deflectors utilize a series of ramps or castellations interposed with spaces to divide the airflow into smaller flows as well as up and away from the roof-opening.

With any method in which the airflow is diverted, high pressure areas are formed. After formation, the high pressure areas equalize with the adjacent lower pressure areas resulting in reattachment of the airflow. Both styles of known deflectors cause reattachment at different distances from the deflectors depending on the speed of the vehicle. If reattachment occurs at a distance that is over the roof-opening, buffeting or repeated flow change may occur. When the frequency of the buffeting approaches the natural frequency of the body of air that is in the vehicle, undesirable changes in pressure and unwanted noise result.

While many attempts have been made to control airflow over a vehicle roof-opening, the variations in vehicle speed and profile have exposed the limitations of each known design. Thus, it remains desirable in the art to provide an apparatus which more effectively deflects wind and causes airflow to stabilize as it passes over a roof-opening. It is also desirable that such an apparatus delay the reattachment point of the airflow to a distance past the roof-opening.

SUMMARY OF THE INVENTION

It is a general object of the present invention to provide an improved apparatus for the deflection of wind over a sliding or removable roof segment of a vehicle that causes the air to stabilize and increases the distance at which airflow reattachment occurs.

In one form, the present invention provides an apparatus for reducing the buffeting effect of airflow over a removable or retractable roof-opening disposed in the roof of a vehicle. The apparatus includes a rail adjacently mounted to the leading edge of the roof-opening. Attached to the rail is a deflector or castellation for selectively routing the airflow up and over the roof-opening. Connected to the top of the castellation deflector is a trip segment that extends forwardly.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1 is a perspective view of an air deflecting apparatus constructed in accordance with the teachings of a preferred embodiment of the present invention, the air deflecting apparatus shown operatively associated with a motor vehicle having a roof-opening.

FIG. 5 is another simplified and partially cut-away side view similar to FIG. 3, the motor vehicle is now illustrated to include the air deflecting apparatus of the present invention, the airflow over the top surface of the vehicle is again shown schematically.

DETAILED DESCRIPTION OF THE PREFERRED EMBODIMENT

Figure 2A:
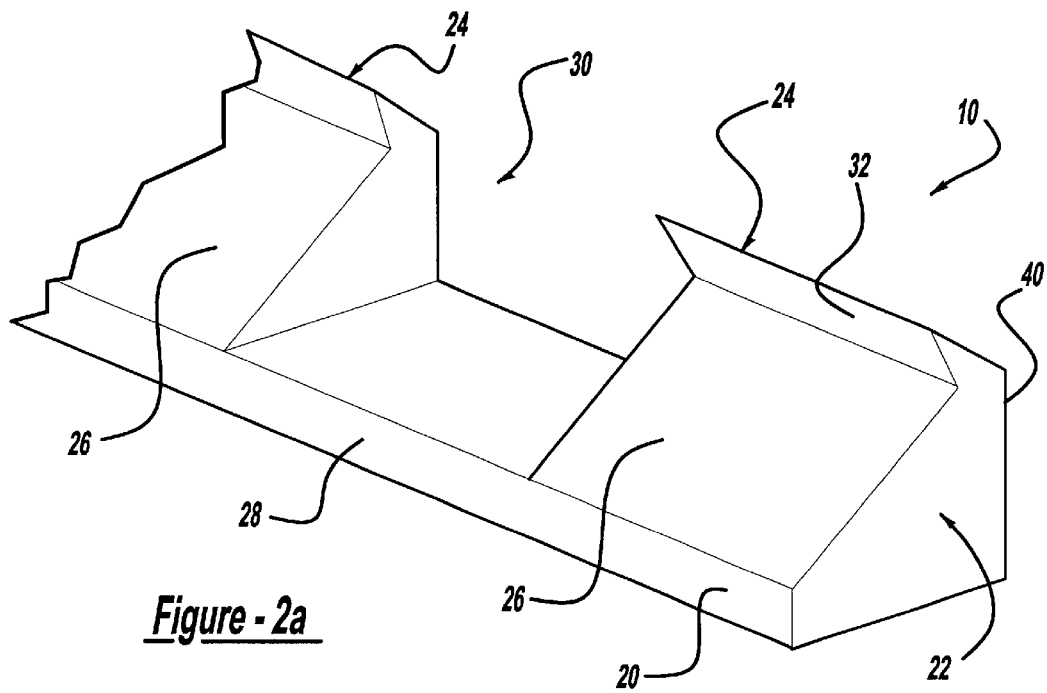
FIG. 2A is an enlarged perspective view of a portion of the air deflecting apparatus of the present invention shown removed from the vehicle for purposes of illustration.

With initial reference to FIG. 1, an apparatus for deflecting air constructed in accordance with the teachings of a preferred embodiment is generally illustrated and identified at reference number 10. The apparatus 10 is shown operatively associated with an exemplary motor vehicle 12 having a roof-opening 14. It will become apparent to those skilled in the art that the apparatus 10 is not restricted for use with any particular vehicle. The apparatus 10 is intended for use with any vehicle having a sliding or removable section. Additionally, it will be understood that the teachings of the present invention are suitable for motor vehicles with removable or retractable tops.

Vehicle 12 is conventionally illustrated to include a windshield 16, a roof 18 and a substantially rectangular roof-opening 14 for a sliding or removable roof section. Roof-opening 14 can be closed by a cover. In FIG. 1, roof-opening 14 is open and the cover is moved out of position.

Figure 2B:
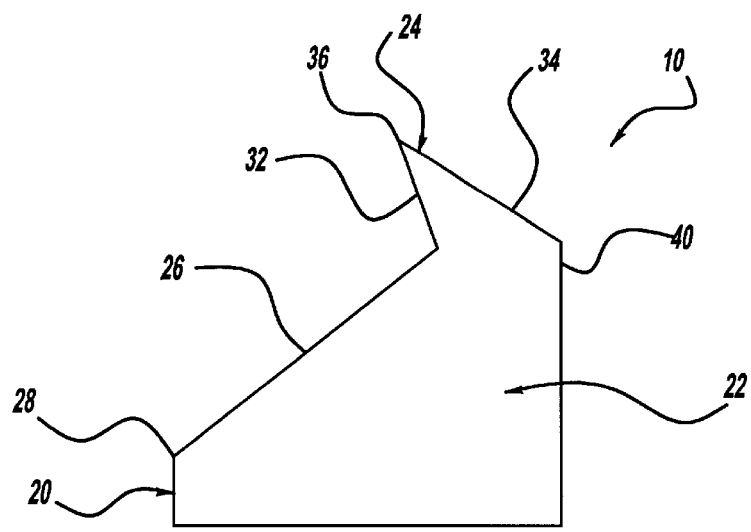
FIG. 2B is an enlarged side view of the apparatus of the present invention.

With continued reference to FIG. 1 and additional reference to the enlarged perspective views of FIGS. 2A and 2B, the apparatus 10 is illustrated to generally include a base or rail 20, at least one castellation on main body portion 22, and a forwardly angled trip segment 24 associated with each castellation 22. Rail 20 is operative for mounting apparatus 10 deflector assembly 10 to the vehicle 12 as an assembly. Apparatus 10 is shown positioned immediately adjacent a front edge of roof-opening 14. While not particularly illustrated, it will be understood that apparatus 10 may be secured to vehicle 12 in any known manner in the art, including but not limited to the use of discrete fasteners. Such attachment to a motor vehicle is conventional.

At least one castellation 22 upwardly extends from rail 20. In the exemplary embodiment illustrated, apparatus 10 is shown to include two castellations 22. However, it will be understood by those in the art that a single castellation 22 or three (3) or more castellations may be incorporated within the scope of the present invention.

Each castellation 22 includes a forward or air engaging face 26. Air engaging face 26 is preferably planar and forwardly terminates at a vertical front edge 28 of base 20. Air engaging face 26 upwardly and rearwardly extends at an angle.

When multiple castellations are utilized, an opening 30 is disposed between the castellations 22. The function of opening 30 is to divide the airflow that contacts the deflector into smaller pieces. In present deflectors that do not utilize castellations, the deflected air forms one large pocket of air beyond the deflector having high pressure.

As known in the art, a high pressure pocket will seek to equalize with the adjacent lower pressure pockets. The equalization of these large pockets causes large amounts of air to flow from high to low pressure areas. In the present problem, a flow from the high pressure area, past the deflector, to the low pressure area, in the vehicle, causes passenger discomfort. In recognition of the characteristics of flow of large pockets, castellations 22 seek to divide the large high pressure pockets into smaller pockets. As the flow contacts with the castellations 22, some flow is pushed up and away from the vehicle 12 and the remaining flow travels through opening 30 between the castellations. The flow through opening 30 forms a high pressure pocket separate from the flow that was diverted up and away from the vehicle 12. The additional pocket formed by the opening 30 effectively reduces the size of the first pocket, therefore reducing the size of the equalization flow and reducing buffeting.

With the apparatus 10 of the present invention, the trip segment 24 further serves to direct airflow. Trip segment 24 upwardly extends from castellation 22 and has a generally triangular cross section. Trip segment 24 includes lower face 32 and upper face 34 which intersect at a forward edge 36. The lower face 32 upwardly and forwardly extends from an upper end of castellation 22. The upper face 34 upwardly and forwardly extends from a vertical rear side 40 of castellation.

Apparatus 10 is preferably unitarily constructed of a rigid plastic or other suitable material. In one particular application, the combined height of base 20 and castellation 22 is 0.75 inches and base 20 has a width of 0.75 inches. In this particular application, front face 26 of castellation 22 upwardly and rearwardly extends at an angle of approximately 45° from the horizontal. Further in this application, lower face 32 upwardly and forwardly extends at an angle of approximately 65° from the horizontal and upper face 34 upwardly and forwardly extends at an angle of approximately 45° from the horizontal. Significantly, the angle formed between the front face 26 and the lower face 32 is less than 180°.

Figures 3, 4:
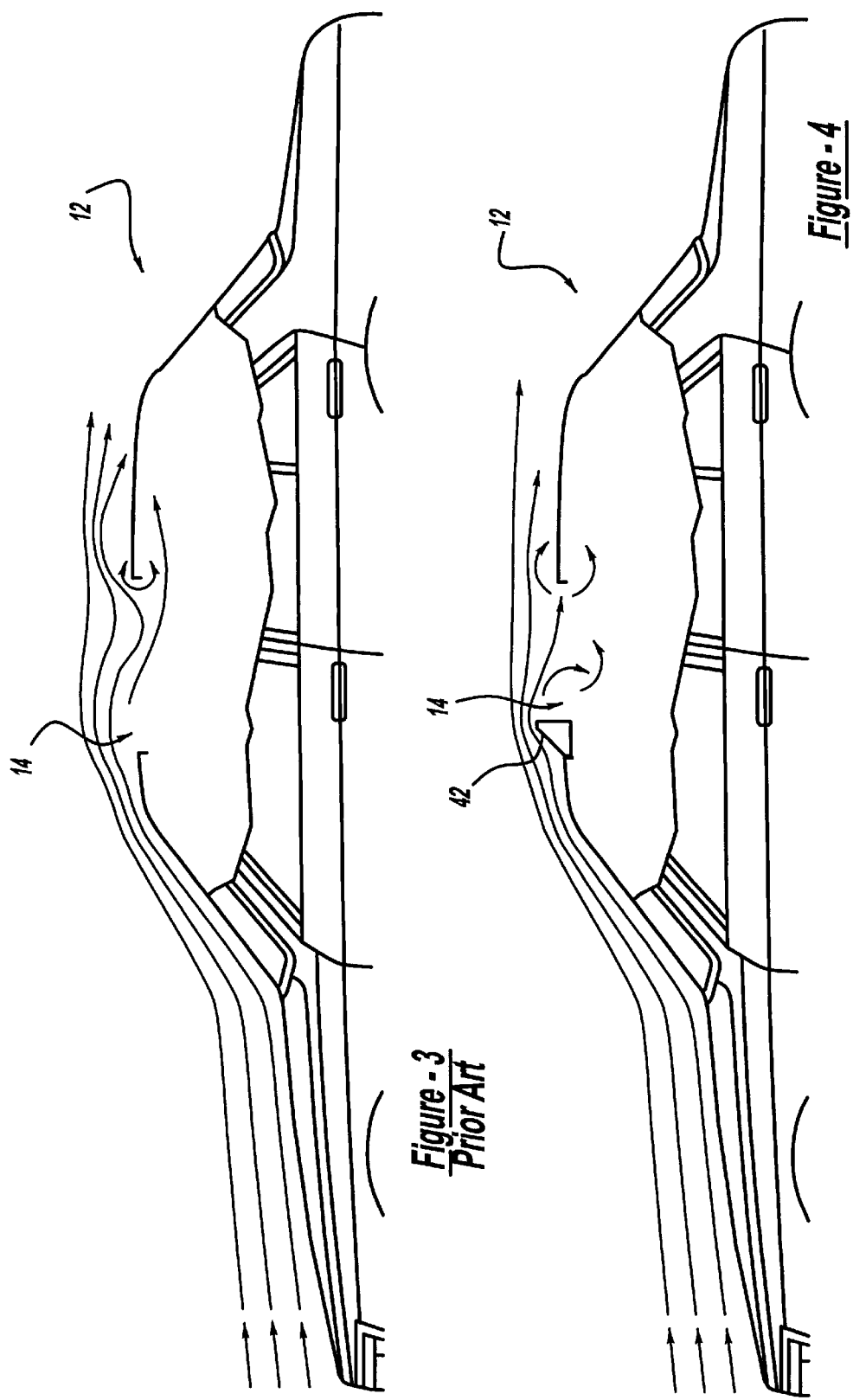
FIG. 3 is a simplified and partially cut-away side view of a conventional motor vehicle without a deflector airflow over the top surface of a vehicle shown schematically.
FIG. 4 is a simplified and partially cut-away side view similar to FIG. 3 but incorporating a conventional air deflector, again airflow over the top surface of a vehicle is shown schematically.

The advantages provided by apparatus 10 of the present invention will become more apparent with reference to FIGS. 3–5. FIG. 3 illustrates the conventional vehicle 12 without any air deflector. FIG. 4 illustrates the conventional vehicle 12 with an air deflector 42 which is similar to apparatus 10 but does not include a trip segment 24. FIG. 5 illustrates the conventional vehicle 12 with apparatus 10 of the present invention.

In each instance, vehicle 12 is shown to be forwardly traveling at a speed of $V_f$. As illustrated, the airflow over the hood of vehicle 12 remains relatively undisturbed. As the airflow interacts with windshield 16, the air flow begins to experience compressible flow. The air flow is slowed and redirected as it comes in contact with windshield 16. Concurrently, air flow that is approaching the windshield 16 pushes on the slowed air increasing the pressure.

As illustrated in FIG. 3, when vehicle 12 has a roof-opening 14 but does not having a deflector assembly, undesired airflow is experienced. Explaining further, compressed air flow that passes over roof-opening 14 flows around the back edge of roof-opening 14. Some of the airflow is ingested into the passenger compartment of vehicle 12, causing passenger discomfort.

In response to the unwanted airflow ingestion, FIG. 4 shows deflector 42 mounted adjacent to front edge of roof-opening 14. Deflector 42 forces the air flow up and away from the roof-opening 14, therefore decreasing the amount of air flow that is ingested into the passenger compartment. However, at certain vehicle speeds, reattachment of the airflow may occur at a point over the roof-opening 14. The reattachment of this airflow may cause buffeting. As discussed above, buffeting occurs when the frequency of the airflow in the passenger compartment approaches the natural frequency of a column of air. The undesirable effects of buffering are noise and uncomfortable pressure variations in the passenger compartment.

FIG. 5 shows the airflow characteristics which result with the apparatus 10 of the present invention. Apparatus 10 is located adjacent to the front edge of roof-opening 14 to direct airflow. The airflow that is diverted up and away from the vehicle 12 by the deflector castellation 22 is at an increased pressure as discussed above. The inclusion of a forwardly facing trip segment 24 causes the airflow to be tripped or dramatically slowed and divided into small turbulent flows. The smaller airflow pockets are turbulated into small swirls. These swirls require longer to equalize pressure with the adjacent air.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for reducing the buffeting in a vehicle caused by airflow over a roof-opening, the apparatus comprising:

a base for mounting adjacent to a leading edge of the roof-opening;

at least one castellation upwardly extending from the base, the at least one castellation having an angled front face and a substantially triangular cross-section; and a trip segment upwardly extending from the castellation, the trip segment including a lower face, the lower face of the trip segment and the angled front face of the castellation defining an angle less than 180°.

2. The apparatus of claim 1, wherein the front face of the castellation is oriented at least 45° from the horizontal.

3. The apparatus of claim 2, wherein the lower face of the trip segment is oriented at least 45° from horizontal.

4. The apparatus of claim 3, wherein the at least one castellation includes a plurality of castellations.

5. The apparatus of claim 4, wherein adjacent castellations are separated by an opening.

6. The apparatus of claim 1, wherein the trip segment includes an upper face which forwardly and upwardly extends.

7. The apparatus of claim 6, wherein the upper face is oriented at angle of approximately 45° from the vertical.

8. A motor vehicle comprising:

a body having a roof with an opening; and an apparatus to reduce buffeting in the passenger compartment, the apparatus including:
  a base for mounting adjacent to a leading edge of the roof-opening;
  at least one castellation upwardly extending from the base, the at least one castellation having an angled front face and a substantially triangular cross-section; and
  a trip segment upwardly extending from the castellation, the trip segment including a lower face, the lower face of the trip segment and the angled front face of the castellation defining an angle less than 180°.

9. The vehicle of claim 8, wherein the front face of the castellation is oriented at least 45° from the horizontal.

10. The vehicle of claim 9, wherein the lower face of the trip segment is oriented at least 45° from horizontal.

11. The vehicle of claim 10, wherein the at least one castellation includes a plurality of castellations.

12. The vehicle of claim 11, wherein adjacent castellations are separated by an opening.

13. The vehicle of claim 8, wherein the trip segment includes an upper face which forwardly and upwardly extends.

14. The vehicle of claim 13, wherein the upper face is oriented at an angle of approximately 45° from the vertical.

* * * * *